United States Patent [19]

Grubbs et al.

[11] 4,042,871
[45] Aug. 16, 1977

[54] CONVERSION SYSTEM WITH OVERCURRENT PROTECTION AND START-UP CIRCUITRY

[75] Inventors: Calvin E. Grubbs, Garland; Jack B. Harwell, Euless, both of Tex.

[73] Assignee: ECC Corporation, Euless, Tex.

[21] Appl. No.: 631,813

[22] Filed: Nov. 14, 1975

[51] Int. Cl.² .................... H02H 7/122; H02H 7/127
[52] U.S. Cl. ......................... 363/28; 363/54; 363/37; 363/61
[58] Field of Search ............... 321/2, 4, 14, 45 C, 321/45 S; 219/10.55 B

[56] References Cited

U.S. PATENT DOCUMENTS

| 1,961,057 | 5/1934 | Livingston | 321/45 |
| 2,734,160 | 2/1956 | Franks et al. | 321/14 |
| 3,246,227 | 4/1966 | Strohmeier et al. | 321/4 |
| 3,679,962 | 7/1972 | Wanlass | 321/2 |
| 3,735,237 | 5/1973 | Derby | 219/10.55 B |

FOREIGN PATENT DOCUMENTS

| 1,325,361 | 8/1973 | United Kingdom | 219/10.55 B |

Primary Examiner—William H. Beha, Jr.
Attorney, Agent, or Firm—Giles C. Clegg, Jr.

[57] ABSTRACT

Circuitry for providing high voltage DC power from commercially available 60 hertz AC utility power. The incoming 60 hertz AC voltage is rectified to a DC voltage. This DC voltage is then converted to a high frequency AC voltage by means of a sine wave inverter. This high frequency sine wave voltage is then converted to a different voltage and rectified by a voltage doubler. The inversion and rectification are under the control of logic circuitry which includes means for sensing line faults to provide circuit protection.

10 Claims, 2 Drawing Figures

CONVERSION SYSTEM WITH OVERCURRENT PROTECTION AND START-UP CIRCUITRY

BACKGROUND OF THE INVENTION

This invention relates to power supplies and, more particularly, to circuitry for converting relatively low frequency low voltage AC power to high voltage DC power.

Many applications exist where a constant current high voltage source is desired. For example, present microwave oven power supplies utilize a ferroresonant 60 hertz transformer system. The output of the transformer is supplied to a half wave voltage doubler that converts this to a half cycle pulse suitable for powering a magnetron tube which generates power at microwave frequencies. A magnetron is a device that does not conduct current until the voltage applied thereto exceeds a threshold value. At this point, the magnetron conducts current which is limited only by its internal impedance. Presently used magnetron power supplies take advantage of the current limiting ability of the ferroresonant transformer to limit the magnetron current to a safe level. However, the voltage doubler in such systems is connected for half wave operation. In order to provide the desired average power, the system must deliver large amounts of power during the powered half cycle, resulting in a generally undesirable high peak to average power ratio.

It is therefore an object of the present invention to provide an improved high voltage DC power supply.

It is a further object of this invention to provide such a power supply with a reduced peak to average power ratio.

It is another object of this invention to provide a power supply protected from faults and overvoltages generated by transients and surges on the incoming commercial power line.

Similarly, arc discharge light producing systems, such as mercury vapor, fluorescent, high pressure sodium, etc., require high voltage current limited AC power to power their ballast systems.

It is therefore a still further object of this invention to provide an improved high voltage current limited AC power supply.

SUMMARY OF THE INVENTION

The foregoing and additional objects are attained in accordance with the principles of this invention by advantageously providing circuitry for converting commercially available 60 hertz AC power to high voltage DC power. This circuitry rectifies the incoming AC power, converts the rectified DC power to high frequency AC power, then converts the high frequency AC power to high voltage DC power. The foregoing is achieved under the control of logic circuitry which is synchronized to the 60 hertz input. A high frequency oscillator is utilized to control the incoming rectifier and the intermediate inverter stage. A fault detector connected to the incoming line provides an enabling signal for the oscillator. A line fault which would result in excessive currents causes the removal of the enabling signal. If high voltage AC power is required, it may be tapped off the output of the intermediate inverter stage.

DESCRIPTION OF THE DRAWING

The foregoing will be more readily apparent upon reading the following description in conjunction with the drawings in which.

DESCRIPTION OF THE PREFERRED EMBODIMENT

Figure 1:
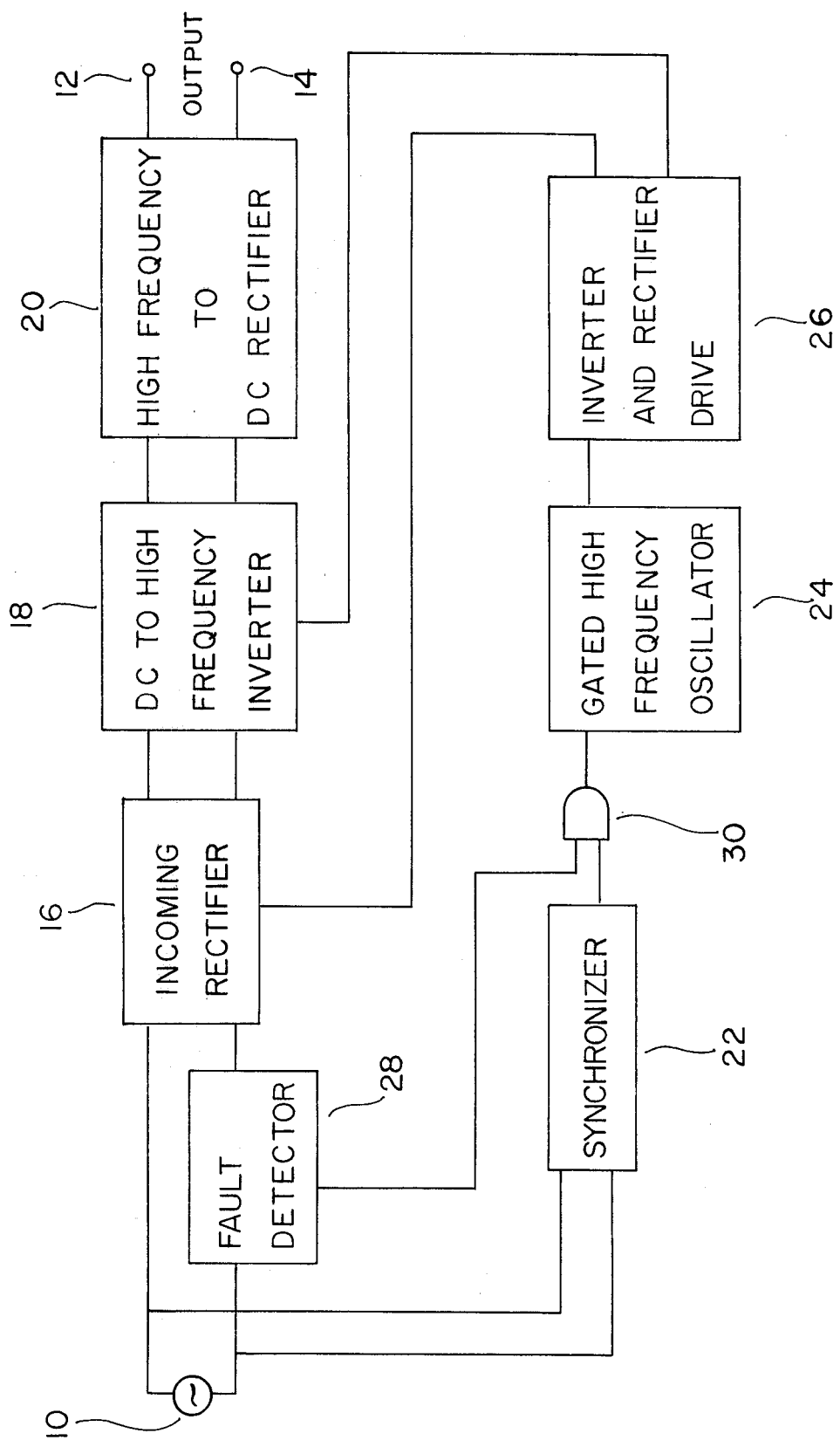
FIG. 1 depicts a schematic block diagram of illustrative circuitry operating in accordance with the principles of this invention for providing high voltage DC power from commercially available 60 hertz AC power.

Referring now to FIG. 1, depicted therein is a block diagram of circuitry operating in accordance with the principles of this invention for converting commercially available 60 hertz AC power from source 10 to high voltage DC power across output terminals 12 and 14. The output power across terminals 12 and 14 is generated by first rectifying the input 60 hertz AC power in incoming rectifier 16, converting this rectified power to a high frequency AC in inverter 18 and then converting the high frequency AC to high voltage DC power in rectifier 20. The circuitry is controlled by logic which comprises synchronizer 22, gated high frequency oscillator 24, and inverter and rectifier drive 26. Synchronizer 22 is connected across input source 10 and provides pulses at a 60 hertz rate. Assuming the output of fault detector 28 to gate 30 to be high, the pulses from synchronizer 22 pass through gate 30 and enable oscillator 24 which in turn enables inverter and rectifier drive circuit 26 at the high frequency required by the circuitry. Fault detector 28 is in series with input source 10 and responds to line faults such as power surges that might damage the circuitry by removing the high input to gate 30, thereby turning off the power conversion circuitry. The purpose of operating at the high frequency is that magnetic components, such as transformer cores, require less material at the high frequency, allowing for smaller and lighter power supplies. In addition, the high frequency is outside the range of human hearing and hence avoids the generation of the sometimes irritating frequency encountered in present day supplies of this type. High voltage current limited AC power is available at the output of inverter 18.

Figure 2:
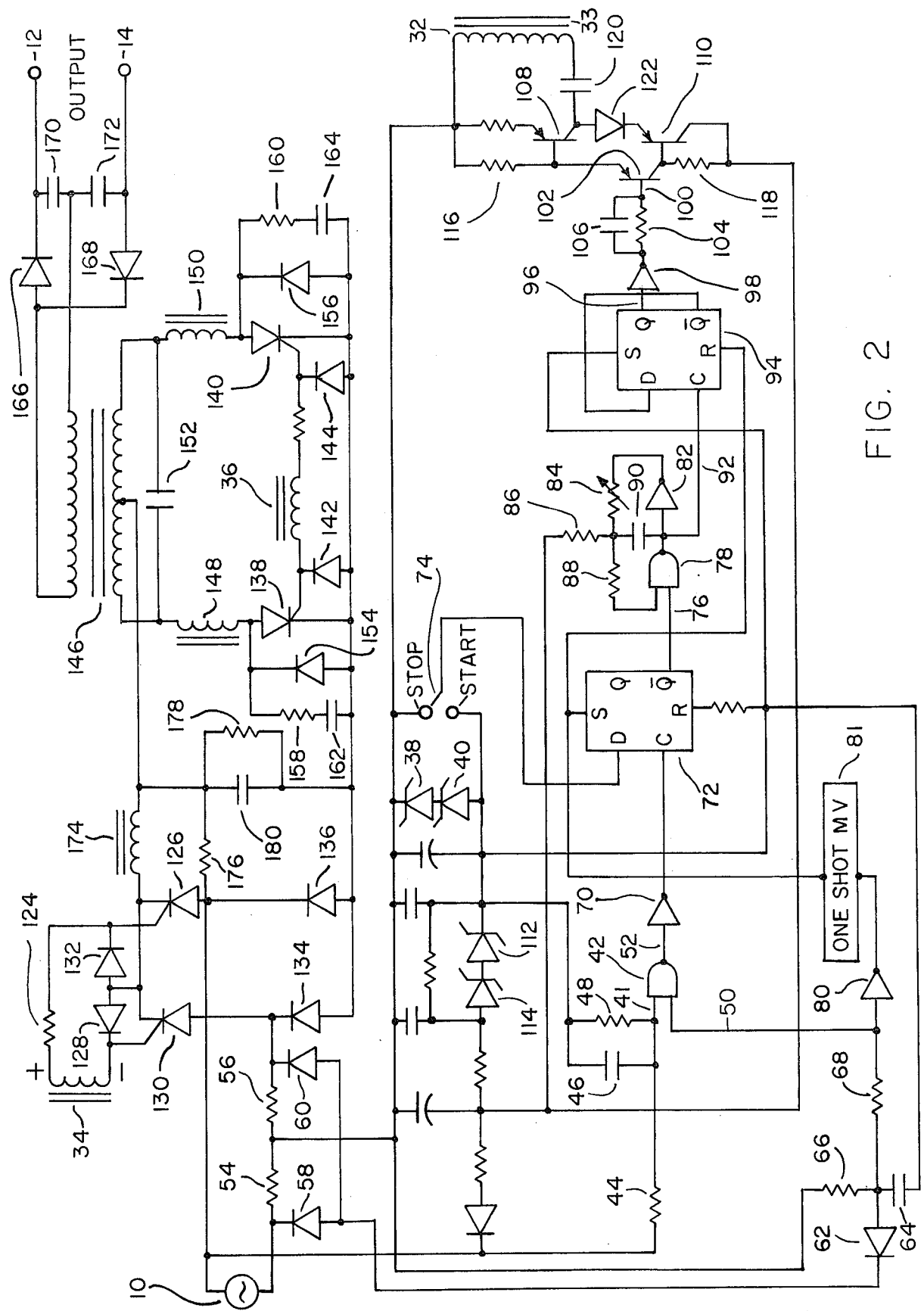
FIG. 2 depicts a detailed schematic diagram of illustrative circuitry implementing the block diagram of FIG. 1.

Referring now to FIG. 2, depicted therein is a detailed electrical schematic diagram of circuitry implementing the block diagram of FIG. 1. This circuitry is designed to convert the 120 volt 60 hertz input from source 10 to a 4,000 volt DC output across terminals 12 and 14. The output voltage is generated under the control of digital logic circuitry which functions to provide a high frequency pulse train to the primary winding 32 of a transformer 33 having two secondary windings 34 and 36 when no fault condition is detected in the incoming line. The digital logic circuitry comprises discrete components and integrated circuit logic elements. The integrated circuit logic elements derive their power from across zener diodes 38 and 40, which are illustratively 6.2 volt zener diodes, the logic circuitry therefore operating with nominally 12 volt logic levels.

To synchronize the operation of the power supply circuitry, a sample of the incoming 60 hertz signal is applied to one input 41 of gate 42 via the network comprising resistor 44, capacitor 46 and resistor 48. Assuming for a moment the existence of a high signal on the other input 50 of gate 42, the threshold of input 41 of gate 42 is utilized to detect positive half cycles of the incoming 60 hertz wave form. From approximately 300 microseconds after a zero crossing at the start of a positive half cycle of the incoming 60 hertz wave form, and until approximately 300 microseconds before a zero crossing at the end of the same positive half cycle, output lead 52 of gate 42 will be low. At all other times it will be high, therefore having an assymetrical square wave with a frequency equal to 60 hertz. Input 50 to gate 42 is supplied by a fault detector which comprises resistors 54 and 56 serially connected to source 10, and a pair of diodes 58 and 60 having their anodes connected together and to diode 62. Resistors 54 and 56 are of very small value, each illustratively being 0.14 ohm. These resistors, in combination with diodes 58 and 60 sense excessive currents caused by a fault such as a power surge in the source 10 or by the inverter circuit drawing too much current. Under such a condition, a low level signal is applied to the cathode of diode 62 with respect to its anode. Capacitor 64 filters this signal, resistor 66 sets a bias level and resistor 68 acts as a current limiter to the input 50 of gate 42. Thus in the event of a fault, a low signal is applied to input 50, disabling gate 42.

Assuming that the fault signal is not present, the square wave on lead 52 is inverted by inverter 70 and applied to the C input of D-type flip-flop 72. D-type flip-flop 72 has the following operating characteristics. The Q and Q outputs are complementary. The Q output assumes a logic ONE state when a logic ONE is applied to the S input. The Q output assumes a logic ONE state when a logic ONE signal is applied to the R input. The Q output assumes the state applied to the D input at the positive going transition of a clock pulse applied to the C input. Therefore, when the clock pulses from inverter 70 are applied to the C input of flip-flop 72, the Q output of flip-flop 72 assumes the state complementary to the state of the input signal applied to the D input of flip-flop 72. The D input of flip-flop 72 is connected to switch 74. Switch 74 may be placed in either the STOP or START positions, the STOP position applying a logic ONE signal to the D input of flip-flop 72 and the START position applying a logic ZERO to the D input of flip-flop 72. Assuming that switch 74 is in the START position, a logic ZERO is applied to the D input of flip-flop 72 and the Q output of flip-flop 72 on lead 76 to gate 78 is at a high level. Note that the fault signal on lead 50 is inverted by inverter 80 and applied to one shot multivibrator 81, which in turn is connected to the S input of flip-flop 72. Thus, if there is a fault signal present, a pulse is applied to the S input of flip-flop 72, overriding the other inputs. The period of one shot 81 is illustratively chosen to be a few cycles of the 60 cycle input so that line transients causing faults have time to settle out. In addition, since a fault condition is an indication of high currents, the period of one shot 81 permits the semiconductor junctions to cool. Gate 78 is a part of a gated high frequency oscillator, the remainder of which comprises inverter 82, resistors 84, 86 and 88 and capacitor 90. A high frequency square wave appears on output line 92 when a logic ONE signal is on lead 76. This high frequency square wave is at approximately 34 kilohertz, twice the desired output operating frequency of the high voltage converter.

The high frequency square wave on lead 92 is applied to the C input of D type flip-flop 94, which is of the same type as flip-flop 72. Flip-flop 94 is connected as a toggle flip-flop, its output changing state every time the input signal to its C input goes positive. The Q output of flip-flop 94 on lead 96 is therefore a square wave at half the frequency of the input on lead 92. The square wave signal on lead 96 is inverted by inverter 98 and applied to the base 100 of transistor 102 through the network comprising drive limiting resistor 104 and high frequency compensating capacitor 106. Transistors 108 and 110 are PNP power transistors that are connected across a nominal 24 volt supply obtained across the string of four 6.2 volt zener diodes 38, 40, 112 and 114. Transistor 102 and equal valued resistors 116 and 118 provide a means for translating the 12 volt logic signal to permit driving the power transistors 108 and 110. When the signal on lead 96 is a logic ONE, the output of inverter 98 is a logic ZERO and this causes transistor 102 to turn on. When transistor 102 turns on, this causes transistor 108 to turn on and conduct current, charging capacitor 120. When a logic ZERO appears on lead 96, transistor 102 is turned off, turning off transistor 108. Transistor 110 is connected as an emitter follower with respect to transistor 102 and turns on when transistor 102 turns off. Transistor 110 turning on allows capacitor 120 to discharge through primary winding 32, diode 122 and transistor 110. Since the signal on lead 96 is in the form of a square wave, a train of current pulses pass through transformer primary winding 32.

The current pulses in transformer primary winding 32 are transformed by secondary windings 34 and 36 and are used to selectively switch silicon controlled rectifiers (SCR's) in the incoming rectifier and DC to high frequency inverter sections of the circuitry, the sections being denoted by reference numerals 16 and 18, respectively, in FIG. 1. Turning now to the incoming rectifier section driven by transformer secondary winding 34, if that winding has a voltage impressed thereon of the polarity marked in FIG. 2, current will flow out of secondary winding 34 through current limiting resistor 124 into the gate of SCR 126 and out of its cathode, through diode 128 and then back to winding 34, turning on SCR 126. On the next half cycle, the current through winding 34 is reversed and its flow into the gate of SCR 130 and out of its cathode and through diode 132, turning on SCR 130. In this manner, the SCR's 126 and 130 in conjunction with diodes 134 and 136 form a gated full wave rectifier. A similar gate drive configuration is utilized for the DC to high frequency inverter section as shown by the connections of transformer secondary winding 36 with SCR's 138, 140 and diodes 142 and 144. The DC to high frequency inverter is a sine wave inverter comprising transformer 146, commutating inductors 148 and 150, commutating capacitor 152, SCR's 138 and 140, diodes 154 and 156, resistors 158 and 160 and capacitors 162 and 164. The operation of this sine wave inverter is well known in the art and is described for example in the article by Neville Mapham entitled "An SCR Inverter With Good Regulation And Sine Wave Output" published in the IEEE Transactions on Industry and General Applications, Volume IGA-3, Pages 176 – 187, March/April, 1967.

The component values are chosen so as to present a current limited sine wave to the primary of transformer 146 such that a voltage of 500 volts RMS is presented to the transformer 146 primary at the peak of the incoming 60 hertz sine wave. This voltage is transformed by transformer 146 and applied as an input to the full wave voltage doubler comprised of diodes 166 and 168 and capacitors 170 and 172 to provide the desired 4,000 volt DC output across terminals 12 and 14.

Transformer 146 is constructed with a large leakage inductance. This inductance serves as a current limiting impedance to prevent damage to the inverter. Prior art inverters utilizing ferroresonant transformers take advantage of the current limiting ability of the ferroresonant transformer. However, the voltage doublers used in some of these prior art systems are only connected for half wave operation. This provides a supply requiring a large ratio of peak to average power in order to achieve the desired output power. The aforedescribed circuitry constructed in accordance with the principles of this invention utilizes full wave inversion and hence reduces the peak to average power ratio.

The foregoing description has assumed steady state operation of the circuitry shown in FIG. 2. An important aspect of this circuitry is the manner in which the operation is initiated. With power applied to the circuitry from source 10 but with switch 74 in its STOP position, the circuitry is inoperative because flip-flop 72 is set and a low signal on lead 76 disables the oscillator. When switch 74 is placed in the START position, a logic ZERO is applied to the D input of flip-flop 72 which switches to its reset state when a positive going signal is applied to its C input. This positive going signal occurs approximately 300 microseconds prior to the end of a positive half cycle of the incoming 60 hertz wave form. This particular point in time is chosen because the currents of the incoming source are advantageously low and since the inverter section of the circuitry goes into a fault condition, in a manner to be described hereinafter, the low source current is insufficient to cause one shot multivibrator 81 to trigger.

Prior to switch 74 being moved to the START position, capacitor 180 is precharged to approximately 70 volts. After switch 74 is moved to the START position and after the initial synchronized switching of state of flip-flop 72, pulses are applied at approximately a 17 kilohertz rate to the primary 32 of transformer 33. These pulses will cause one of SCR's 138 and 140 to turn on. Because capacitor 180 has been precharged, SCR's 126 and 130 are both back biased. Assuming for the moment that SCR 140 is turned on, current flows from capacitor 180 through half the primary of transformer 146 through inductor 150 and through SCR 140. A resonant circuit exists with capacitor 152 and inductor 150. This resonant circuit attempts to go into a ringing state but is prevented by the effects of transformer 146. About 33 microseconds later, SCR 138 is turned on due to the effects of the pulse train through transformer 33. A new resonant circuit exists at this time which includes inductors 148 and 150 and capacitor 152. This resonant circuit attempts to discharge capacitor 152. There are two opposing currents in the primary of transformer 146 and the ringing current is insufficient to turn off SCR 140. Since both SCR's are turned on, the energy stored in capacitor 180 is dumped into both inductors 148 and 150. This situation would normally be considered a fault which would turn off the circuitry, but as has been described previously, the starting is synchronized with a lower current point so that the fault detector is not triggered. As capacitor 180 is discharged, SCR's 126 and 130 are no longer back biased and delivery of energy to the circuitry output from source 10 is initiated. Inductor 174 limits the rate of rise of current from SCR's 126 and 130 and prevents a fault condition. Although it is not clear exactly how, approximately 100 microseconds after the switch 74 is placed in the start position, the ringing of the resonant circuits ceases and the operation of the circuitry reverts to its steady state mode of operation, with SCR's 138 and 140 alternately conducting.

The resonant frequency of the inverter section of the circuitry is approximately 22 kilohertz. The output voltage of the inverter circuitry depends upon how close to that resonant frequency is the frequency of pulses in secondary winding 36. The closer these two frequencies are, the higher the output voltage. In theory, if there were no losses, the output voltage would approach infinity as the gap between the two frequencies diminished. Variable resistor 84 may be utilized advantageously to adjust the power output by varying the frequency of the gated oscillator. In addition, resistor 86 is connected to sense fluctuations in the input line voltage and adjust the oscillator frequency accordingly. In this manner, automatic compensation for input line voltage fluctuations is advantageously achieved.

It should be noted at this point that whereas prior art inverter circuitry required regulated DC power at the center tap of transformer 146, the abovedescribed improved circuitry operates from raw unfiltered full-wave rectified power, thereby achieving a substantial economic advantage.

Accordingly, there has been described a high voltage constant current DC power supply. While the invention has been described with reference to its preferred embodiment, it will be understood by those skilled in the art that various changes may be made and equivalents substituted for elements thereof without departing from the true spirit and scope of the invention, as defined by the appended claims. In addition, many modifications may be made to adapt a particular situation to the teachings of the invention without departing from its essential teachings. For example, due to the constant current nature of the aforedescribed circuitry, the principles illustrated herein can be utilized to power the ballast systems of many types of arc-discharge light producing systems, such as mercury vapor, fluorescent, high pressure sodium, etc.

What is claimed is:

1. Inverter circuitry comprising:
    means for receiving low frequency AC power including fault detector means responsive to current in said receiving means above a predetermined level for providing a fault signal;
    control means for generating a high frequency control signal synchronized with a low current point of said low frequency AC power and responsive to said fault signal for terminating the generation of said control signal;
    full wave rectifier means coupled to said receiving means and responsive to said control signal for converting said low frequency AC power to full wave rectified pulsating DC power;
    inverter circuit means coupled to said full wave rectifier means and responsive to said high frequency control signal for providing an AC signal at said high frequency from said DC power output of said full wave rectifier means;
    a capacitor connected across the input to said inverter circuit means; and
    means for precharging said capacitor to a preselected voltage;

said capacitor providing sufficient energy to the inverter circuit means when said high frequency control signal is initially applied to said inverter circuit means to permit commutation under steady state conditions without generation of a fault signal.

2. The circuit of claim 1 further including an inductor means connected between said full wave rectifier means and said inverter circuit means to limit the build up of current from said full wave rectifier means to said inverter means.

3. The circuitry of claim 2 further comprising:
output rectifier means coupled between said inverter means and a pair of output terminals for converting said high frequency AC signal to high voltage DC power across said output terminal pair.

4. The circuitry of claim 3 wherein said output rectifier means includes voltage doubler means.

5. The circuitry of claim 2 wherein:
said control means includes high frequency oscillator means and transformer means having a primary winding and a secondary winding with said primary winding being coupled to said oscillator means, and
said inverter means includes a pair of silicon controlled rectifiers having their gate electrodes coupled to respective ends of said secondary winding and their cathode terminals connected together, said inverter means further including a pair of diodes each connected across the gate to cathode terminals of a respective one of said silicon controlled rectifiers and poled opposite to the polarity of the gate to cathode junction of the respective silicon controlled rectifier.

6. The circuitry of claim 5 wherein:
said transformer means further includes an additional secondary winding, and
said full wave rectifier means includes a pair of silicon controlled rectifiers having their gate electrodes coupled to respective ends of said additional secondary winding and their cathode terminals connected together, said full wave rectifier means further including a pair of diodes each connected across the gate to cathode terminals of a respective one of said silicon controlled rectifiers and poled opposite to the polarity of the gate to cathode junction of the respective silicon controlled rectifier,
said capacitor when charged preventing conduction by said pair of silicon controlled rectifiers until said silicon controlled rectifiers become forward biased as a result of discharges of said capacitor and increases in the instantaneous voltage of the low frequency AC voltage.

7. The circuitry of claim 6 wherein said inverter means further includes:
a second transformer means including a center tapped primary winding, the center tap being connected to said full wave rectifier means;
a commutating capacitor connected across said center tapped primary winding and,
inductor means coupled between the anode terminals of said silicon controlled rectifiers and respective ends of said commutating capacitor.

8. The circuit of claim 7 wherein said control means includes an oscilator circuit for generating said high frequency control signal, a flip flop circuit having an output connected to said oscilator circuit for enabling said oscilator circuit when said flip flop output is at one level and disabling said oscilator circuit when said flip flop output is at a second level, means responsive to a start signal causing the output of said flip flop to assume a first state in which the output at the one level responsive to the low frequency AC power being near the end of a half cycle and to assume a second state responsive to the presence of a stop signal or a fault signal.

9. The circuitry of claim 2 wherein said control means includes high frequency oscillator means and means for varying the frequency of said oscillator means inversely to the fluctuations of voltage of the low frequency AC power.

10. The circuit of claim 1 wherein the control means is synchronized to generate the high frequency control signal near the end of a positive half cycle of the low frequency AC power.

* * * * *